(12) United States Patent
Zapata (10) Patent No.: US 6,834,070 B2
(45) Date of Patent: Dec. 21, 2004

(54) EDGE-FACET PUMPED, MULTI-APERTURE, THIN-DISK LASER GEOMETRY FOR VERY HIGH AVERAGE POWER OUTPUT SCALING

(75) Inventor: Luis E. Zapata, Livermore, CA (US)

(73) Assignee: The Regents of the University of California, Oakland, CA (US)

(*) Notice: Subject to any disclaimer, the term of this patent is extended or adjusted under 35 U.S.C. 154(b) by 644 days.

(21) Appl. No.: 09/771,387

(22) Filed: Jan. 26, 2001

(65) Prior Publication Data

US 2003/0161376 A1 Aug. 28, 2003

Related U.S. Application Data

(60) Provisional application No. 60/190,131, filed on Mar. 16, 2000.

(51) Int. Cl.[7] ............................. H01S 3/91; H01S 3/92
(52) U.S. Cl. ............................. 372/70; 372/75; 372/69; 372/43; 372/44; 372/45; 372/46; 372/47; 372/48; 372/49; 372/50; 372/36; 372/67; 372/34
(58) Field of Search ............................. 372/70, 78, 69, 372/43–50, 36, 67, 34

(56) References Cited

U.S. PATENT DOCUMENTS

5,793,521 A * 8/1998 O'Brien et al. ............. 359/344
6,347,109 B1 * 2/2002 Beach et al. ................. 372/75

* cited by examiner

Primary Examiner—Minsun Oh Harvey
Assistant Examiner—Delma R. Flores-Ruiz
(74) Attorney, Agent, or Firm—John P. Wooldridge; Alan H. Thompson

(57) ABSTRACT

The average power output of a laser is scaled, to first order, by increasing the transverse dimension of the gain medium while increasing the thickness of an index matched light guide proportionately. Strategic facets cut at the edges of the laminated gain medium provide a method by which the pump light introduced through edges of the composite structure is trapped and passes through the gain medium repeatedly. Spontaneous emission escapes the laser volume via these facets. A multi-faceted disk geometry with grooves cut into the thickness of the gain medium is optimized to passively reject spontaneous emission generated within the laser material, which would otherwise be trapped and amplified within the high index composite disk. Such geometry allows the useful size of the laser aperture to be increased, enabling the average laser output power to be scaled.

47 Claims, 5 Drawing Sheets

Gain distribution (ray trace)

GAIN ~ 40-200 μm

FIGURE 4D  ISOLATION GROOVE ~ 140-700 μm

EDGE-FACET PUMPED, MULTI-APERTURE, THIN-DISK LASER GEOMETRY FOR VERY HIGH AVERAGE POWER OUTPUT SCALING

This application claims the benefit and is a continuation-in-part of U.S. patent application Ser. No. 60/190,131, titled "Method for Optical Pumping of Thin Laser Media at High Average Power," filed Mar. 16, 2000, incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the performance of high average power solid-state lasers, and more specifically, it relates to techniques for optically pumping thin solid-state laser media and scaling such laser media to produce high average power.

2. Description of Related Art

The performance of high average power solid-state lasers is in large part determined by the geometry of pump light delivery to the gain medium and on the intensive cooling that must accompany it. For example, some devices utilize pump light impinging on a face of a slab or along the barrel of a rod in a geometry commonly referred to as side-pumping. In some cases, it is desirable to utilize an end-pumping geometry in order to achieve high delivery efficiency due to limitations in the absorption length of the laser material. Side pumping and end pumping schemes rely on side cooling. Side cooling induces stress and optical deformations that limit the quality and ultimately the level of output power possible by either end or side pumping schemes. The subject of this patent adds to the method advanced in the disclosure of the parent application, which described a side pumped laminated light-guide/gain-medium composite that is strikingly robust and resolves prior difficulties with high average power pumping/cooling and the rejection of amplified spontaneous emission.

SUMMARY OF THE INVENTION

It is an object of the present invention to provide techniques for scaling the output power of a disk laser to produce high average power.

It is another object of the present invention to provide an apparatus and method that reduce amplified spontaneous emission in the laser gain medium of a thin disk laser.

These and other objects and advantages of the present invention will become apparent from the following description and accompanying drawings.

In this invention, the average power output of a laser is scaled, to first order, by increasing the transverse dimension of the gain medium while increasing the thickness of an index matched light guide proportionately. Strategic facets cut at the edges of the laminated gain medium provide a method by which the pump light introduced through edges of the composite structure is trapped and passes through the gain medium repeatedly. Spontaneous emission escapes the laser volume via these facets. The large face of the laser medium is exposed and is used for cooling. The approach is better described as edge pumping with face cooling. High absorption is possible using moderate concentrations of dopant while minimizing the laser medium thickness.

A key aspect of this invention is the efficient delivery of pump light to a thin-disk laser medium of minimum thickness. This maximizes the laser output because in a face-cooled disk, inversely with the thickness of the gain medium, more average power per unit area is possible for the same peak surface stress.

An optical advantage is also gained from the "thinness" of the laser gain medium, i.e., the fraction of spontaneous emission that remains within the solid angle of the gain medium is proportional to the square of the thickness of the gain medium. Amplified spontaneous emission (ASE) limits the transverse dimensions of an aperture in complex ways related to the geometric details surrounding the gain medium. However, in general, if the detailed geometry is designed properly, a larger transverse aperture is possible with thinner laser medium dimensions.

A thin disk of laser material is bonded to a planar light guide of an index-matched material forming a composite disk. Diode array or other pump light is introduced into the composite disk through the edges of the disk. Pump light trapped within the composite disk depletes as it multi-passes the laser medium before reaching an opposing edge of the disk, thus energizing the laser material. The principles for pumping have been covered in the parent application. The present invention recognizes that in a solid-state laser, the shape of the high index gain medium has an intrinsic effect on the scalability of the output power. The present invention invokes a multi-faceted disk geometry optimized to passively reject spontaneous emission generated within the laser material, otherwise trapped and amplified within the high index composite disk, thus increasing the useful size of the laser aperture, the principal means of scaling the output power. The shape of the disk and details on the strategic placement of facets for the purpose of introducing pump light and/or rejecting spontaneous emission are the subject of this invention. As in the parent application, the resulting compound optical structure delivers pump light efficiently and concentratedly to a laser medium of minimum thickness. The external face of the laser medium is used for cooling. A high performance cooler attached to the external face of the laser medium rejects heat. Laser beam extraction is parallel to the heat flux to minimize optical distortions. Other laser beam extraction schemes are possible.

The present invention has applications in amplified spontaneous emission suppression in solid-state lasers, high average power lasers for industrial applications such as drilling, welding, materials processing, laser illumination, dye laser pumping for isotope separation. Other applications that may become possible with the high brightness afforded include deep laser drilling, thick plate laser welding, large throughput CVD deposition of diamond and other films.

The present invention utilizes all of the embodiments of U.S. patent application Ser. No. 09/237,142, titled "High Average Power Scaleable Thin-Disk Laser" by Beach et al., filed Jan. 25, 1999 and incorporated herein by reference. Embodiments of lens duct designs usable in the present invention are described in U.S. Pat. No. 5,307,430, which is incorporated herein by reference. Also usable in the invention are optical concentrators, as disclosed in U.S. Pat. No. 6,160,934, titled "Hollow Lensing Duct", incorporated herein by reference.

DETAILED DESCRIPTION OF THE INVENTION

Figure 1:
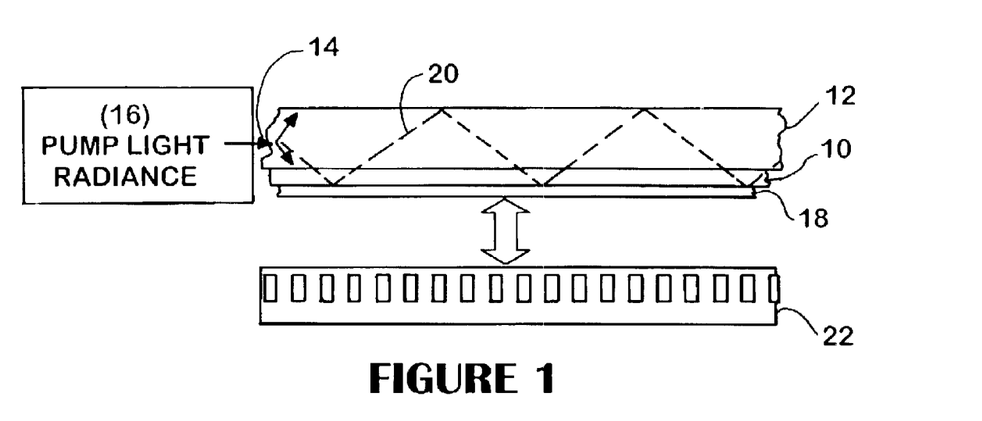
FIG. 1 shows an embodiment of the invention of the parent application including a laser gain medium bonded to a disk of the same shape and substantially the same index of refraction.

Shown in FIG. 1 is the basic geometry claimed in the parent application for providing strong excitation and simultaneous cooling of a laser gain medium within a light trap of substantially equal index of refraction. Light introduced at the edges of the device is trapped between the top and bottom surfaces of the composite disk passing through the laser gain medium repeatedly, energizing it.

The composite structure of FIG. 1 includes a laser gain medium 10 bonded to a disk 12 of the same shape and substantially the same index of refraction. Pump light 14 from pump source 16 is introduced through the edge(s) of the device. Preferably, the pump light is radiance conditioned so that it will be trapped by total internal reflection. The external surface of the laser gain medium 10 is HR coated with coating 18 at the laser wavelength and also at the pump wavelength. A dashed line 20 exemplifies the repeated passes a representative pump ray makes through the laser gain medium. The advantage of using a doped/undoped composite disk is that the undoped thickness is adjusted to adequately trap the pump light, and the doped thickness and length are adjusted to adequately absorb the pump light.

The exposed external face of the laser gain medium 10 with the HR coating 18 is soldered to a high performance cooler 22 to remove excess heat. An example of a cooler that can be used in the present invention is the microchannel cooler used in cooling high power diodes. Coolers usable in the present invention are disclosed in U.S. Pat. No. 5,105,429, titled "Modular Package For Cooling A Laser Diode Array", incorporated herein by reference, U.S. Pat. No. 5,105,430, titled "Thin Planar Package For Cooling An Array Of Edge-Emitting Laser Diodes", incorporated herein by reference, and U.S. Pat. No. 5,548,605, titled "Monolithic Microchannel Heatsink", incorporated herein by reference. An impingement cooler or a spray cooler can also be employed. A simple copper cooler can also be employed for applications requiring less output power.

The present invention includes all of the embodiments of the parent application; however, it makes further advances, e.g., related to: (i) the existence of maximum gain times transverse-disk-dimension and (ii) the use of particular facets or shapes at the edges of the device for rejecting Amplified Spontaneous Emission (ASE). The present invention also provides a method for further scaling the laser aperture to even higher average power by the addition of "grooves" that optically isolate gain-islands, thus enabling significantly larger transverse dimensions for the laser aperture.

Figure 2A:
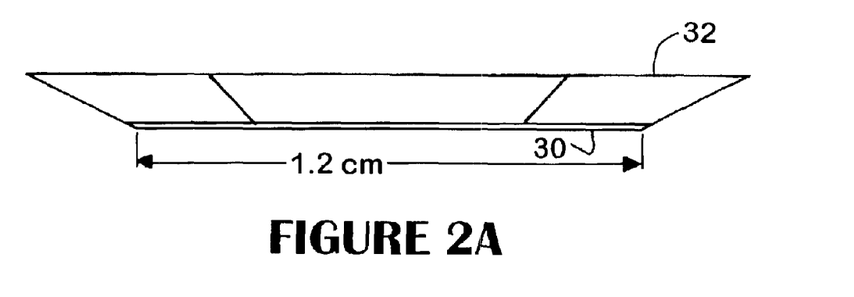
FIG. 2A shows a hexagonally shaped laser disk and an index matched layer, both having 30° canted facets at their edges.
Figure 2B:
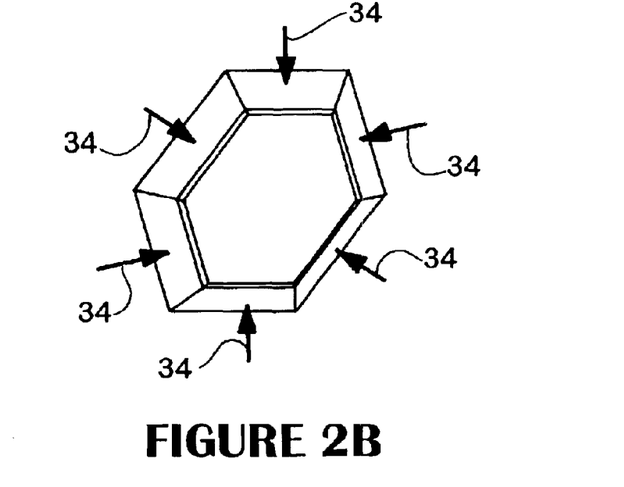
FIG. 2B shows a perspective view of the laser disk composite of FIG. 2A and illustrates the introduction of pump light into the canted edges of the index matched layer.
Figure 2C:
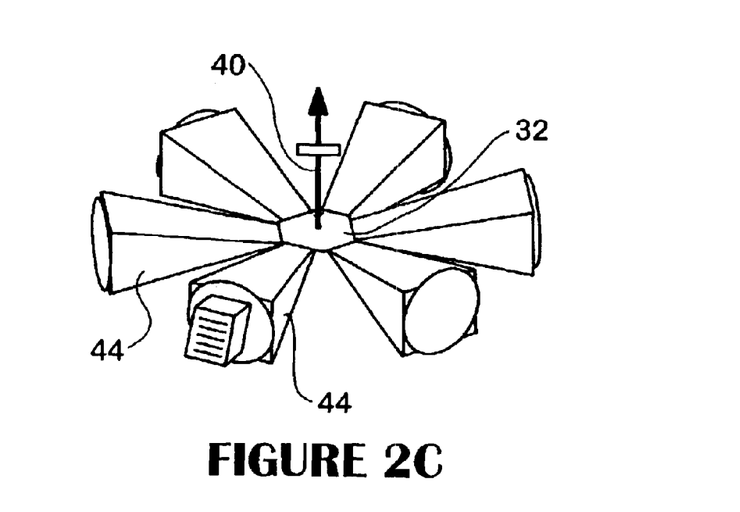
FIG. 2C shows an embodiment of the invention with the laser gain medium placed at the center and pumped by six diode stacks fitted with lens ducts for pump light delivery.

FIG. 2A shows a hexagonally shaped laser disk 30 and index matched layer 32, both having 30° canted facets at their edges, with particular dimensions that are estimated to render the laser aperture to be ASE limited. In one embodiment utilizing this configuration, laser disk 30 has a smallest transverse dimension of 1.2 cm and a thickness of 0.2 mm. The laser disk 30 comprises a 15% Yb:YAG layer. The index matched layer 32 is 1.3 mm and comprises undoped YAG. FIG. 2B shows a perspective view of the laser disk composite of FIG. 2A and illustrates the introduction of pump light 34 into the canted edges of the index matched layer 32. FIG. 2C shows an embodiment of the laser placed at the center and pumped by six diode stacks fitted with lens ducts for pump light delivery. In this figure, the undoped index matched layer 32 is visible from the top, from which the output beam 40 propagates. Six 2.6 kW diode stacks 42 (only one shown) provide pump light which is directed by separate lens ducts 44 from each diode stack into the index matched layer and into the laser medium 30 (hidden from view by the index matched layer). An output coupler 46 is provided. The laser output is estimated at 8 kW for this single aperture device. The calculation for the output power of the device in FIG. 2C was made by first calculating the power absorbed in the laser medium by applying a ray trace model based on a commercial package (TracePro™) that includes measurements of the diode stack radiance and the measured absorption coefficient of the Yb:YAG gain medium. Thermal calculations using another commercial package (FlexPDE™) were used to estimate the operating temperature and stress level for the device. A laser energetics code that includes the quasi-3-level nature of the lasing $Yb^{3+}$ ion was developed by the present inventor and benchmarked in experiments with Yb:YAG prototypes. In the particular embodiment of FIGS. 2A–2C, the laser medium aperture to thickness of the composite (aspect ratio) are determined (within a range), by the radiance of the diode array and the absorption coefficient of the 15% Yb:YAG. That is, there is a particular range of aspect ratios that will optimize the absorption of the diode pump light given the radiance of the diodes and absorption coefficient of the gain medium. The thickness of the gain medium is made thick enough to absorb but thin enough to be cooled without risk of fracture. For this particular system, the aperture to thickness aspect ratio optimized between 4 and 8 for a gain element thickness of about 200 µm. See FIG. 3 and the discussion below.

Figure 3A:
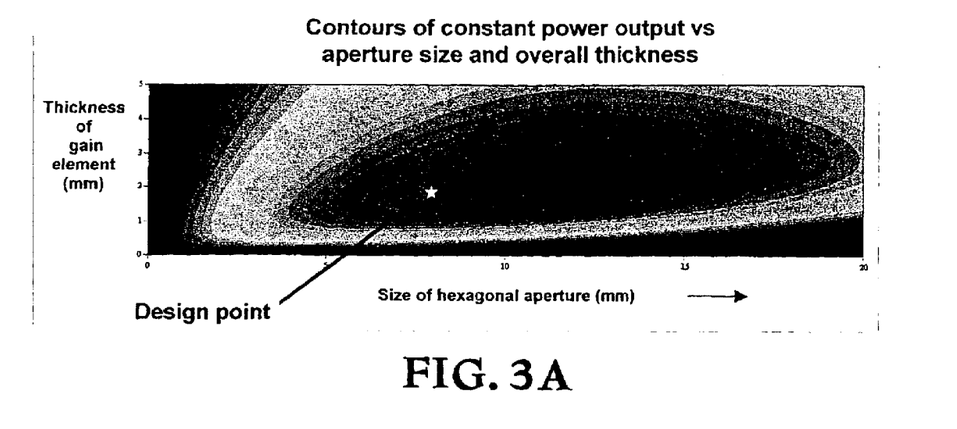
FIG. 3A shows the optimized hexagonal design for a 1 kW output and illustrates the procedure followed for optimizing the present invention at a desired power level for the chosen laser materials properties.
Figure 3B:
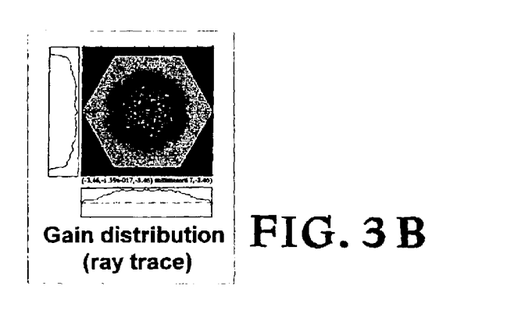
FIG. 3B shows the gain distribution across the aperture for the design point of FIG. 3A.

FIG. 3A shows the optimized hexagonal design for a 1 kW output and illustrates the procedure followed for optimizing the present invention at a desired power level for the chosen laser materials properties. The parametric plot of output power versus aperture size includes optimization of (i) pump transport efficiency to the edges of the slab given the measured brightness of the pump diode stacks, (ii) the absorption efficiency given the doping-times-thickness product of the (Yb:YAG) gain sheet, (iii) the laser energetics given a 3-level laser model to determine the laser output. The maximum stress level of the surface is also considered to avoid the fracture and the pump uniformity for better overlap with the expected laser mode is also considered. FIG. 3B shows the gain distribution across the aperture for the design point of FIG. 3A.

A range of aperture-to-thickness aspect ratio is selected that will scale the output to higher powers. The optimized aspect ratio depends on some intangibles to particular systems such as the intra-cavity optical losses by mirror coatings and other laser elements, the selection of the laser material properties (higher absorption means lower aspect ratio while higher laser cross section means higher aspect ratio, the fracture toughness of the material also plays a role. Therefore, an aspect ratio having a wide range of between 4 and 10 is selected at first given the 15% Yb:YAG of this example. Smaller prototypes can be built to optimize experimentally the aspect ratio and thickness of the gain medium before building a very large device.

FIGS. 4A–D show elements of an embodiment of the invention scaled to higher average powers. The transverse dimension of the laser aperture can be increased for power scaling. The thickness of the undoped index matched layer is made thicker proportionally to the gain medium aperture diameter, approximately maintaining the aspect ratio and gain medium thickness of the composite element in FIG. 2A, thus increasing the total power delivered to the laser medium. Therefore the energy deposited per unit laser-aperture area remains constant. Optically invariant as well is the number of passes through the gain medium for the average pump ray and average ASE ray which does not change. Likewise, the thermal intensity dissipated by the cooled surface does not change at all. The laser small signal gain remains the same. A problem arising from scaling the aperture size is that the fluorescence born within the solid angle of the gain medium generates photons that amplify transversely to the beam extraction dimension (which is defined herein to be along the z-axis here). If the transversely traveling photons are allowed to propagate within the gain medium and across the aperture, the ASE grows exponentially and the resulting transverse super-fluorescence would deplete the gain within. Constructing the gain sheet with built-in optical isolation "scribes" between gain "islands" of substantially the same dimensions as prescribed above for the single ASE limited aperture of FIGS. 2A–C will circumvent this problem. The scribes or "grooves" deflect the photons traveling within the gain medium away from the transverse dimension into the index-matched layer reducing the total path-length traversed through the gain medium. The isolating grooves occupy only 1 to 5% of the aperture area depending on the gain layer thickness, which can range between 40 μm and 200 μm depending on the Yb doping concentration. This kind of phase-screen does not prevent a single mode beam from extracting the full aperture and becomes an optical loss in the far field, which can be accounted for in the resonator design.

Figure 4A:
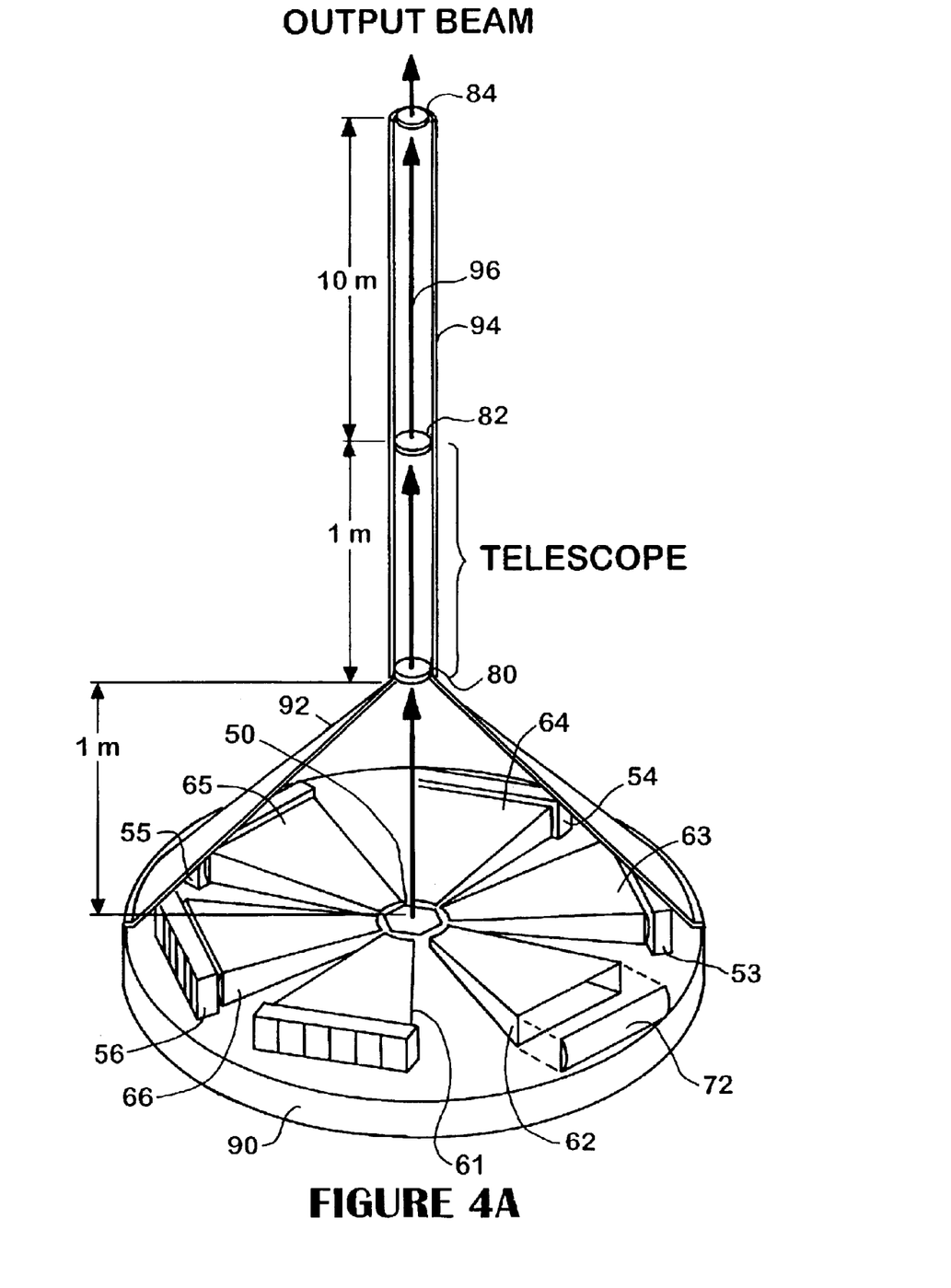
FIG. 4A is a perspective view of a high average power embodiment of the present invention.

In FIGS. 4A–D, scaling to very high average power (~100 kW output and greater) is accomplished by proportionally increasing the aperture diameter and the thickness of the index-matched layer. FIG. 4A is a perspective view of a high average power embodiment of the present invention. The laser gain element is located at the center as in FIG. 2C, and is hidden from view by the index-matched layer 50. A backplane cooler of a type described above is located behind the laser gain element. Six diode laser arrays 51–56 (52 not shown) provide pump light, which is directed by six lens ducts 61–66, into the index-matched layer 50. The lens ducts 61–66 each include a rectangular lens (71–76, with only 72 shown) at their input ends to effectively collect the light from the six laser diode arrays 51–56. In scaling the laser gain medium to the larger transverse areas required to produce high average power, the gain layer thickness does not change and is dictated by the Yb doping (with the present state of the art for the doping concentration being 15% doping of Yb for ~200 μm thick Yb:YAG). A telescopic resonator configuration is shown in FIG. 4A for extracting the laser power in a high quality beam. In one embodiment, the input lens 80 of the telescope is located 1 meter from the index-matched layer 50. The collimating lens 82 of the telescope is located 1 meter from the input lens 80. The output coupler 84 is located at 10 meters from the collimating lens 82. The laser gain medium, back plane cooler, index-matched layer 50, lens ducts 61–66 and the six laser diode arrays 51–56 are mounted on a supporting disk 90, which includes a cone shaped cover 92 that is connected at its narrow end to a beam tube 94, that supports the telescope and output coupler and encloses the laser beam 96.

Figure 4B:
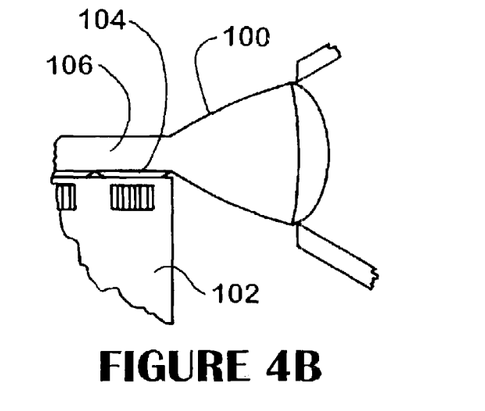
FIG. 4B shows a configuration for injecting light from laser diode pump lasers into the index-matched layer of the invention.

FIG. 4B shows a configuration for injecting light from the laser diode pump lasers into the index-matched layer 50. In this figure, the index-matched layer 50 includes a flanged end 100 that operates to collect light from the lens duct in a manner consistent with the operation of the flanged end-caps described in U.S. Pat. No. 5,936,984, titled "Laser Rods With Undoped, Flanged End-Caps For End-Pumped Laser Applications", incorporated herein by reference. One difference between the use of the end caps in the present invention as compared to the invention disclosed in U.S. Pat. No. 5,936,984 is that the flanged area is located on the index-matched layer instead of on the laser medium itself. The present invention, however, can alternately include a flanged end-portion on the laser medium in addition to or instead of locating the end-cap on the index-matched layer. The flanged portion 100 and back-plane cooler 102 next to the laser medium 104 are shown in side-view in FIG. 3B.

Figure 4C:
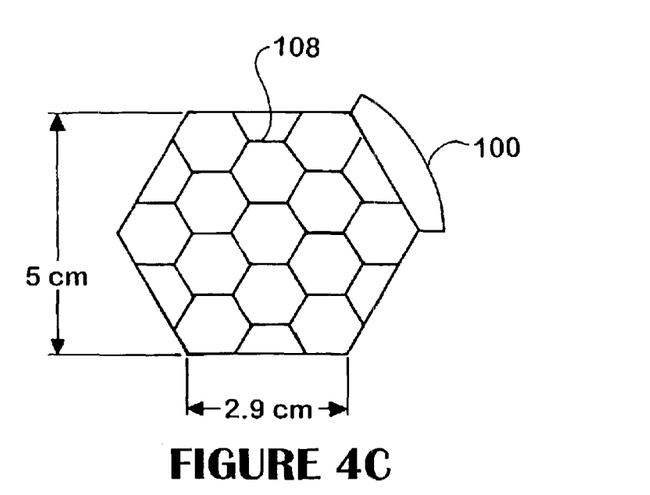
FIG. 4C shows the aperture of a hexagonal gain element partitioned into sub-apertures by grooves.
Figure 4D:
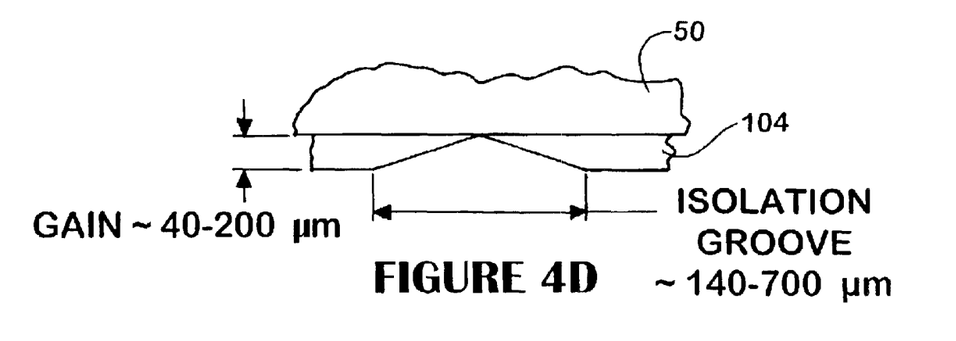
FIG. 4D shows one geometry of the grooves of FIG. 4C.

Referring to FIG. 4C, the aperture of the hexagonal gain element is partitioned into sub-apertures by grooves 108. Although multiple hexagonal apertures are shown, other alternate aperture configuration may be used as well and are within the scope of this invention. The figure is a top view of the gain element 104, illustrating the elongated design of the flanged element 100. FIG. 4D shows one geometry of the grooves 108. In the figure, index-matched layer 50 is shown in contact with gain medium 104. An isolation groove 108 is located in laser gain medium 104. In this example, the isolation groove has a maximum width within a range of 140 to 700 μm. The grooves optically isolate neighboring gain "islands" or apertures from fluorescent photons traveling transversely within the gain medium. Such transversely traveling photons will be reflected out of the laser gain medium 104 by edges 110, 112 of isolation groove 108. In this manner, the isolation grooves prevent the growth of ASE.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

I claim:

1. A laser, comprising:
    a solid-state laser gain medium having a first surface and a second surface opposite to and substantially parallel with said first surface:
    an index-matched layer attached to said first surface of said laser gain medium, wherein said index matched layer comprises about the same index of refraction as said laser gain medium and further comprises at least one edge;

an optical pumping mechanism configured to optically pump said index matched layer from said at least one edge; and a spontaneous emission reducer (SER) for reducing spontaneous emissions from said laser gain medium, wherein said SER is selected from the group consisting of at least one shaped edge on said index-matched layer, at least one shaped edge on said laser gain medium and at least one isolation groove in said laser gain medium.

2. The laser of claim 1, wherein said spontaneous emission reducer reduces or eliminates amplified spontaneous emission (ASE), wherein said at least one shaped edge comprises a shape selected from the group consisting of canted, conic, parabolic and lens.

3. The laser of claim 1, wherein said laser will produce an average power that is scaled, to first order, by increasing the transverse dimension of the gain medium while increasing the thickness of said index-matched layer proportionately.

4. The laser of claim 1, wherein said at least one isolation groove is located in said second surface of said gain medium.

5. The laser of claim 1, wherein said at least one isolation groove comprises a plurality of isolation grooves that form at least one optically isolated gain island.

6. The laser of claim 5, wherein said at least one optically isolated gain island comprises a plurality of optically isolated gain islands.

7. The laser of claim 1, wherein said at least one shaped edge comprises an angle approximately equal to 90°−arcsin (1/n).

8. The laser of claim 1, wherein said at least one shaped edge is canted at an angle of about 30 degrees with respect to said first surface.

9. The laser of claim 1, wherein said laser gain medium comprises a plurality of shaped edges.

10. The laser of claim 1, wherein said laser gain medium comprises about 15% Yb:YAG.

11. The laser of claim 1, wherein said index matched layer comprises undoped YAG.

12. The laser of claim 1, wherein said index matched layer is optically pumped from two or more edges.

13. The laser of claim 1, wherein said index matched layer comprises an index of refraction difference Δn with respect to the index of refraction n of said laser gain medium, wherein Δn/n is less than or equal to cos (t/s)−1, wherein it is the thickness of said laser gain medium and s is the longest path found across the aperture.

14. The laser of claim 1, wherein said laser gain medium comprises an index of refraction that is lower than the index of refraction of said index matched layer.

15. The laser of claim 1, further comprising a reflective layer attached to said second surface of said laser gain medium.

16. The laser of claim 1, wherein said undoped layer has a thickness that is adjusted to adequately trap the pump light, and the doped layer has a thickness and length that are adjusted to adequately absorb the pump light.

17. The laser of claim 1, wherein said index-matched layer has a thickness that is adjusted to accept the amount of pump light required for the desired output power.

18. The laser of claim 1, wherein said the laser gain medium has a thickness and length that are adjusted to adequately absorb pump light while keeping the inversion density high for efficient laser extraction and the surface stress caused by heat gradients within limits.

19. The laser of claim 1, wherein said solid-state laser gain medium comprises a shape selected from the group consisting of a disk and a slab.

20. The laser of claim 1, further comprising means for cooling said laser.

21. The laser of claim 20, further comprising a reflective layer attached to said second surface of said laser gain medium, wherein said means for cooling said laser comprises a cooler attached to said reflective layer.

22. The laser of claim 21, wherein said cooler comprises a high performance cooler.

23. The laser of claim 14, wherein said reflective layer comprises a high reflector thin-film stack that reflects the laser wavelength at the laser beam extraction angle.

24. The laser of claim 23, wherein said high reflector thin-film stack comprises at least one layer selected from the group consisting of copper, gold and silver.

25. The laser of claim 1, wherein said index matched layer comprises an anti-reflective coating designed to transmit the laser wavelength.

26. The laser of claim 1, further comprising an output coupler positioned to reflect pump light and transmit light from said laser.

27. The laser of claim 1, wherein said index matched layer and said laser gain medium are diffusion bonded together.

28. A method for operating a laser, comprising:

providing a solid-state laser gain medium having a first surface and a second surface opposite to and substantially parallel with said first surface;

providing an index matched layer attached to said first surface of said laser gain medium, wherein said index matched layer comprises about the same index of refraction as said laser gain medium and further comprises at least one edge;

providing a spontaneous emission reducer (SER) for reducing spontaneous emissions from said laser gain medium, wherein said SER is selected from the group consisting of at least one shaped edge on said index-matched layer, at least one shaped edge on said laser gain medium and at least one isolation groove in said laser gain medium; and optically pumping said index matched layer from said at least one edge.

29. The method of claim 28, further comprising cooling said laser.

30. A method of fabricating a laser, comprising:

providing a solid-state laser gain medium having a first surface and a second surface opposite to and substantially parallel with said first surface;

attaching an index matched layer to said first surface of said laser gain medium, wherein said index matched layer comprises about the same index of refraction as said laser gain medium and further comprises at least one edge;

providing a spontaneous emission reducer (SER) for reducing spontaneous emissions from said laser gain medium, wherein said SER is selected from the group consisting of at least one shaped edge on said index-matched layer, at least one shaped edge on said laser gain medium and at least one isolation groove in said laser gain medium; and providing means for optically pumping said index-matched layer from said at least one edge.

31. The method of claim 30, further comprising scaling said laser by increasing the transverse dimension of the gain medium while increasing the thickness of said index-matched layer proportionately.

32. The method of claim 30, wherein said at least one isolation groove is located in said second surface of said gain medium.

33. The method of claim 30, wherein said at least one isolation groove comprises a plurality of isolation grooves are configured to form at least one optically isolated gain island.

34. The method of claim 33, wherein said at least one optically isolated gain island comprises a plurality of optically isolated gain islands.

35. The method of claim 30, wherein said at least one shaped edge comprises an angle approximately equal to $90°-\arcsin(1/n)$.

36. The method of claim 30, wherein said at least one canted edge is canted at an angle of about 30 degrees with respect to said first surface.

37. The method of claim 30, further comprising designing said index matched layer to have an index of refraction difference $\Delta n$ with respect to the index of refraction n of said laser gain medium, wherein $\Delta n/n$ is less than or equal to $\cos(t/s)-1$, where t is the thickness of said laser gain medium and s is the longest path found across the aperture.

38. The method of claim 37, wherein said laser gain medium is designed to have an index of refraction that is lower than the index of refraction of said index matched layer.

39. The method of claim 30, further comprising attaching a reflective layer to said second surface of said laser gain medium.

40. The method of claim 30, further comprising designing the thickness of said undoped layer so that said undoped layer adequately traps pump light, the method further comprising designing the thickness and length of said doped layer so that said doped layer adequately absorbs pump light.

41. The method of claim 30, further comprising designing said undoped layer so that said undoped layer has a thickness that accepts the amount of pump light required for the desired output power.

42. The method of claim 30, further comprising designing said doped layer to have a thickness and length that adequately absorbs pump light while keeping the inversion density high for efficient laser extraction and the surface stress caused by heat gradients within limits.

43. The method of claim 30, further comprising providing means for cooling said laser.

44. The method of claim 30, further comprising attaching a reflective layer to said second surface of said laser gain medium, further comprising attaching a cooler to said reflective layer, wherein said cooler is used for cooling said laser.

45. The method of claim 30, further comprising attaching an anti-reflective coating to said index matched layer, wherein said an anti-reflective coating transmits the laser light emitted by said laser.

46. The method of claim 30, further comprising providing an output coupler positioned to reflect pump light and transmit light from said laser.

47. The method of claim 30, further comprising diffusion bonding said index matched layer and said laser gain medium together.

* * * * *